United States Patent [19]

Iwao et al.

[11] 4,369,200

[45] Jan. 18, 1983

[54] METHOD FOR PRODUCING FATTY CONFECTIONERIES HAVING THREE-DIMENSIONAL DECORATION DEPOSITED THEREON

[75] Inventors: Hachiya Iwao; Igarashi Susumu, both of Yokohama, Japan

[73] Assignee: Meiji Seika Kaisha, Ltd., Tokyo, Japan

[21] Appl. No.: 300,700

[22] Filed: Sep. 10, 1981

[30] Foreign Application Priority Data

Sep. 17, 1980 [JP] Japan .............................. 55-127922

[51] Int. Cl.³ .......................... A23G 1/00; A23G 1/20
[52] U.S. Cl. .................................. 426/660; 426/103; 426/104; 426/512; 426/515; 426/517
[58] Field of Search ............... 426/103, 104, 512, 515, 426/660, 517

[56] References Cited

U.S. PATENT DOCUMENTS

| | | | |
|---|---|---|---|
| 615,191 | 11/1898 | Lembke | 426/104 |
| 1,865,097 | 6/1932 | Gilham | 426/515 |
| 1,931,409 | 10/1933 | Humphrey | 426/104 |
| 2,803,202 | 8/1957 | Schafer | 426/512 |
| 3,410,699 | 11/1968 | Peters | 426/512 |
| 3,545,981 | 6/1967 | Klein et al. | 426/515 |
| 4,200,658 | 4/1980 | Katzmann et al. | 426/512 |

FOREIGN PATENT DOCUMENTS

| | | | |
|---|---|---|---|
| 19700 | of 1893 | United Kingdom | 426/512 |
| 1221292 | 2/1971 | United Kingdom | 426/512 |
| 1232646 | 5/1971 | United Kingdom | 426/517 |

*Primary Examiner*—Jeanette M. Hunter
*Attorney, Agent, or Firm*—Koda and Androlia

[57] ABSTRACT

A method for producing fatty confectioneries having three-dimensional decoration deposited thereon comprising the steps of providing a mold having three-dimensional recesses in design, pattern and/or letter configuration, placing a plate mold having through holes corresponding to said recesses in configuration and position on said mold, spraying decorative fatty confectionery material in the form of fine particles into said recesses through said through holes, removing said plate mold from the mold, pouring base fatty confectionery material into said mold over said decorative fatty confectionery material, cooling said mold to cool and solidify said base and decorative fatty confectionery material and removing the resulting confectionery from said mold.

11 Claims, 9 Drawing Figures

METHOD FOR PRODUCING FATTY CONFECTIONERIES HAVING THREE-DIMENSIONAL DECORATION DEPOSITED THEREON

BACKGROUND OF THE INVENTION

This invention relates to a method for producing fatty confectioneries such as chocolate products having attractive three-dimensional decoration in design, pattern and/or letter configuration deposited thereon.

The fatty confectioneries having three-dimensional decoration in design, pattern and/or letter configuration deposited thereon as mentioned above have been conventionally produced by preparing a base confectionery having a desired shape and depositing a fatty confectionery material having a color tone different from that of the base confectionery material such as white, red, yellow or orange or any combination of them on the base confectionery material. The decorative fatty confectionery material may be chocolate or its substitute fatty material having a different color tone from that of the base fatty confectionary material.

For producing the fatty confectioneries referred to above, the squeezing method (1), the casing method (2), the stencilling method (3), the printing method (4) and the scraping method (5) have been generally utilized.

(1) The squeezing method

In this method, a compressible bag formed of cloth or paper and having a nozzle attached to one end thereof is filled with a fatty confectionery material in a fluid state having a different color tone from that of the base fatty confectionery material on which the decoration material is to be deposited and the bag is manually compressed down to extrude the fatty confectionery material through the nozzle in the form of rope or spot onto the selected area of the base fatty confectionery material so as to form a decorative design, pattern and/or letter configuration on the base fatty confectionery material. This method has been widely employed in the art. However, the design, pattern and/or letter configuration formed by this method tends to become a monotonous decoration such as one stroke writing. In addition, when the decorative fatty confectionery material is extruded in the form of rope, portions of the extruded rope tend to lie one above the other and thus, this method is not suitable for forming three-dimensional design, pattern and/or letter having a complex and fine configuration and an acute angle as obtainable by the method of the present invention.

(2) The casting method

In this method, a chocolate mold having decorative design, pattern and/or letter configurations engraved therein is provided, a decorative fatty confectionery material in a fluid state having a different color tone from that of the base fatty confectionery material is poured into the recesses defined by the engraved design, pattern and/or letter configurations in an amount only sufficient to fill up the recesses, the base fatty confectionery material in a fluid state is then poured into the mold over the decorative fatty confectionery material before the decorative fatty confectionery material solidifies to allow the base material and decorative material to unite together, the thus obtained confectionary product is cooled to solidify and finally, the solidified confectionary product is removed from the mold. This method is disclosed in Japanese Utility Model Appln. Publication No. 29401/1969 for "Picture-Framed Chocolate", for example.

According to this method, although the decorative fatty confectionery material in a fluid state is poured into the recesses defined by the design, pattern and/or letter configuration engraved in the forming mold in an amount just sufficient to fill up the recesses and the mold is vibrated so as to distribute the decorative confectionery material uniformly within the recesses, since the base fatty confectionery material such as chocolate to be decorated by the decorative fatty confectionery material generally has a high viscosity and a low fluidity even in a fluid state, the base fatty confectionery material can not be easily distributed uniformly within the recesses. Thus, in this method, the decorative fatty confectionery material is employed to be formed only in such chocolate molds as having a design, pattern and/or letter engraved therein having a relatively monotonous and coarse configuration and an obtuse angle and thus, this method is not applicable to the production of three-dimensional decorative fatty confectioneries comprising a base fatty confectionery material decorated with a fatty confectionery material deposited thereon in a three-dimensional design, pattern and/or letter having a complex and fine configuration and an acute angle.

(3) The stencilling method

In this method, a stencil having through holes or slits in the shape of a design, pattern and/or letter is placed over a cooled and solidified chocolate product to define recesses by the through holes or slits and the upper surface of the chocolate product, a decorative fatty confectionery material is filled in the recesses, any excess amount of the decorative fatty confectionery material which overflows the recesses is scraped off by the use of a scraper, the stencil is removed from the thus decorated chocolate product and the decorated chocolate product is cooled to solidify.

In this method, since the excess decorative fatty confectionery material overflowing the through holes or slits in the stencil is removed and at the same time, the decorative fatty confectionery material is subjected to pressure which forces the material into the slits, the decorative fatty confectionery material can be satisfactorily filled in the recesses even they have complex, minute and acute-angled design, pattern and/or letter configurations and the decorative fatty confectionery material remains in the recesses in an amount corresponding to the total volume of the through holes or slits to thereby form a three-dimensional decorative area on the chocolate product.

However, in this method, the shape of the through holes or slits to be provided in the stencil is subjected to limitations. When the stencil is formed with annular through holes or slits, it is necessary to form a plurality of bridge portions connecting the areas surrounded by the respective annular through holes or slits and the stencil matrix and thus, when the decorative fatty confectionery material is actually stencilled, there is the disadvantage that the formed design, pattern and/or letter decoration contains discontinuous portions therein. In addition, there are the disadvantages that the scraping of the excess decorative fatty confectionery materials roughens the surface of the decorative fatty confectionery material deposited on the chocolate-product and that the decorative fatty confectionery material surface becomes lustreless.

In order to eliminate the disadvantages inherent in this stencilling method, it has been proposed a method in which a stencil having a configuration adapted to be fitted in a mold and through holes having a design, pattern and/or letter configuration is fitted in the mold to define recesses by the inner surface of the bottom of the mold and the through holes, the decorative fatty confectionery material is stencilled by the use of a scraper and deposited on the inner surface of the bottom of the mold in the shape corresponding to that of the through holes, the stencil is then removed from the mold, a base fatty confectionery material in a fluid state is poured into the forming mold and finally, the base and decorative fatty materials are cooled to solidify in the conventional manner. In this way, the surface of the formed decorative fatty confectionery material is imparted lustre thereto. However, in such a case, the decorative fatty confectionery material deposited on the bottom inner surface of the mold and the base fatty confectionery material poured into the mold over the decorative fatty confectionery material lie in substantially the same plane and the obtained fatty confectionery will rather have a flattened decorative area than an intended three-dimensional decorative one.

(4) The printing method

In this method, a cooled and solidified fatty confectionery such as chocolate is directly printed thereon an edible decorative fatty material such as edible ink in the form of a design, pattern and/or letter by the use of a screen. In another method, as shown in Japanese Patent Appln. Publication No. 6156/1967 for "Method and Apparatus for Confectioneries Having Design Printed Thereon", an edible ink is printed in a design on a plastic film or on the inner surface of a mold, a fatty confectionery material such as chocolate in a fluid state is poured onto the plastic film or into the mold, and the confectionery material is cooled to solidify to thereby transfer the design ink onto the confectionery material resulting in a confectionery having the design thereon.

By this method, although it is possible to print the fatty confectionery with a design, pattern and/or letter in a desired fine configuration, since the printed design, pattern and/or letter lies in substantially the same plane as the base chocolate or confectionery and lacks three-dimensional appearance. In addition, because an edible ink is different in nature from the fatty confectionery such as chocolate, the ink will possibly spoil the flavour of the chocolate.

(5) The scraping method

As shown in Japanese Patent Appln. Publication No. 2254/1980 for "Method for Forming Confectionery Having Design", for example, in the scraping method, (i) a flat plate mold having decoration recesses engraved in the upper surface thereof having a design, pattern and/or letter is provided, an edible decorative fatty confectionery material in a fluid state is poured into the recesses and any excess amount of the material overflowing the recesses is removed by a scraper or the like or (ii) a second flat plate mold having through holes corresponding to the recesses in the first-mentioned flat plate mold in configuration and position is placed on the first plate mold, an edible decorative fatty confectionery material in a fluid state is poured into the aligned through holes and recesses in the two plate molds with the recesses and through holes in alignment, a frame mold is placed on the second plate mold surrounding the area of the plate mold where the through holes are present, a base fatty confectionery material in a fluid state is poured into the frame mold, the base and decorative material are cooled in the conventional manner to solidify them, and finally, the solidified fatty confectionery is removed from the frame mold.

In the two alternate scraping methods described above, it is possible to stencil the edible decorative fatty material into the fine engraved decoration deposition area of the plate mold containing the decoration deposition recesses under pressure and upon the cooling and solidification of the obtained fatty confectionery, the edible decorative fatty material deposited on the base fatty confectionery material will have the lustrous surface and the obtained confectionery will have a fine three-dimensional appearance.

However, in the method (i) disclosed in Japanese Patent Appln. Publication No. 2254/1980, the removal of the excess amount of the fluidal edible decorative fatty material overflowing the engraved recesses in the first flat plate mold requires an additional operation by the use of a scraper or the like and the scraping operation is applicable to only flat or substantially flat surface areas and if the flat mold plate has intricate concaves and convexes and/or engraved recesses having fine three-dimensional configurations, when a base fatty confectionery material such as chocolate having a high viscosity is formed by the use of such a plate mold, the confectionery material is difficult to be distributed to all the corners of the recesses and accordingly, after the cooling and solidification, the obtained confectionery will have defects therein.

In the method (ii) referred to hereinabove, although the fluidal decorative fatty material is poured into the engraved recesses in the first flat plate mold through the through holes in the second plate mold disposed on the first plate mold, in such a case, the decorative material tends to build up over the engraved recesses above the upper surface of the first plate mold by the presence of the second plate mold over the recesses and the spaces defined between the bulges are narrow. Thus, when the first plate mold having the fine design, pattern and/or letter engraved therein and the second plate mold having the through holes corresponding to the recesses in shape and position are employed in the manner mentioned above, since the base fatty confectionery material to be poured into the recesses through the through holes has a high viscosity and a low fluidity as mentioned hereinabove, the base confectionery material may not enter the narrow spaces. Thus, after the cooling and solidification, the obtained fatty confectionery will contain voids caused by the absence of the base fatty material in the spaces and the voids impair the value of the confectionery as a commercial article.

Furthermore, if the engraved design, pattern and/or letter recesses are shallow and have a small area and thus, the adhesion power of the decorative fatty material to the recesses is insufficient, when the decorative fatty material is poured through the through holes in the second plate mold into the engraved recesses in the first plate mold and the second plate mold is separated from the first plate mold, the adhesion power of the decorative fatty material to the engraved recesses is overcome by the adhesion power of the decorative fatty material to the walls of the through holes and the undersurface of the second plate mold and thus, there is the disadvantage that a portion or the whole of the decorative fatty material is separated from the first plate mold as the second plate mold is separated from the first plate mold.

Furthermore, in the method (ii) referred to hereinabove, when the excess amount of the decorative fatty material overflowing the engraved recesses in the plate mold is removed by the use of a scraper or the like, the base fatty confectionery material with high viscosity and adhesion power such as chocolate is not wholly scraped off but remains on the upper surface of the first plate mold in a thin layer. And when the frame mold is disposed on the upper or second plate mold surrounding the decoration through holes in the plate mold and the base fatty confectionery material such as chocolate is poured through the through holes in the upper plate mold into the recesses in the lower plate mold followed by the cooling and solidification of the united decorative and base fatty confectionery material, the decorative fatty material adheres to the adjacent surface of the base fatty confectionery material in a thin layer. In this case, if the decorative fatty material has a light color whereas the base fatty confectionery material has a dark color such as the color of ordinary chocolate, the thin layer of the decorative fatty material is not so conspicuous. However, if the base fatty confectionery material is white chocolate with a light color and the edible decorative fatty material is ordinary chocolate with a dark color, the thin layer of the decorative fatty material is conspicuous. When the decorative fatty material is so called non-tempered chocolate which uses non-lauric hard butter containing from 30 to 50% by weight of trans-form mono double bonded unsaturated acid the cacao butter in the base chocolate and the fat in the decorative fatty chocolate melt together and when the cacao butter content in the fat exceeds 40% by weight based on the total weight of the fat, the characteristic of non-tempered chocolate is lost and the non-tempered chocolate exhibits a polymorphism phenomenon to generate a white powder-coated like fat bloom. The non-tempered chocolate which is not perfectly scraped off but remains to adhere to the base chocolate in a thin layer contains non-tempered fat in a reduced ratio and an increased ratio of cacao butter. Thus, a marked fat bloom occurs to reduce the commercial value of the chocolate product substantially. And when ordinary chocolate is used as the decorative fatty material and non-tempered chocolate is employed as the base fatty confectionery material, variation in the combination of the decorative fatty material and base fatty confectionary material is likewise limited to a narrow range.

SUMMARY OF THE INVENTION

Therefore, the present invention is to provide a method for producing fatty confectionery which effectively eliminate the disadvantages inherent in the prior methods referred to hereinabove.

The purpose of the present invention is to provide a method for producing fatty confectioneries such as chocolate products having decorative fatty material deposited thereon in fine and acute-angled three-dimensional design, pattern and/or letter configuration containing intricate concaves and convexes. According to the present invention, there has been provided a method for producing fatty confectioneries comprising the steps of providing a mold having a plurality of decoration deposition recesses having desired design, pattern and/or letter configuration for depositing a decorative three-dimensional fatty confectionery material on a base fatty confectionery material, placing a plate mold having a plurality of through holes corresponding to said recesses in shape and position on the mold with the through holes in alignment with the recesses, spraying a fluid decorative fatty confectionery material in the form of fine particles through said through holes into said recesses to deposit said decorative fatty material in said recesses, removing said plate mold from the mold, pouring a base fatty confectionery material having a different color tone from said decorative fatty confectionery material into said mold, cooling and solidifying said base and decorative fatty confectionery material combination and removing the solidified fatty confectionery from said mold having fine and acute-angled three-dimensional decorative fatty confectionery material deposited on the confectionery.

The above and other objects and attendant advantages of the present invention will be more readily apparent to those skilled in the art from a reading of the following detailed description in conjunction with the accompanying drawings which show apparatus for use in carrying out the present invention for illustration purpose only, but not for limiting the scope of the invention in any way.

BRIEF DESCRIPTION OF THE DRAWINGS

The accompanying drawings show an apparatus for use in carrying out the method of the present invention in which.

PREFERRED EMBODIMENT OF THE INVENTION

Figure 2:
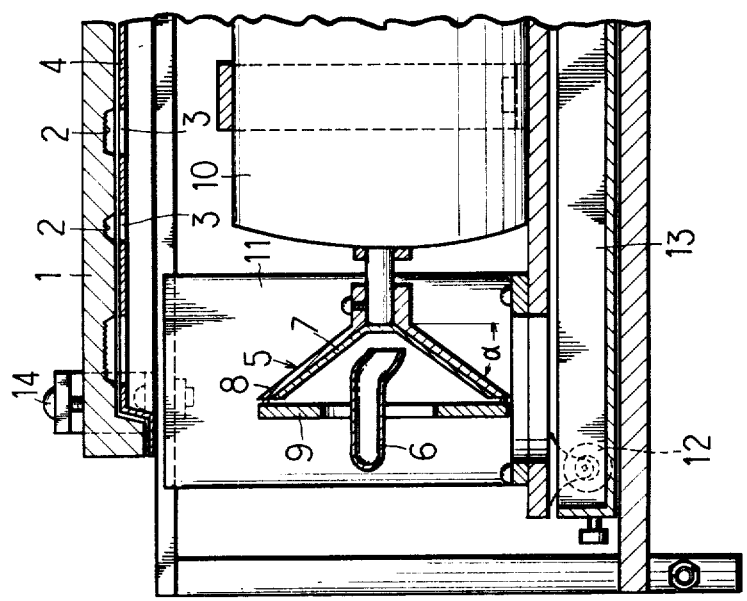
FIG. 2 is a vertically sectional view taken along substantially the line A—A of FIG. 1.

The present invention will be now described referring to the accompanying drawings and more particularly, to FIGS. 1 through 5 thereof in which a representative apparatus for use in carrying out the present invention are shown.

Reference numeral 1 denotes a mold the bottom inner surface of which is formed with a plurality of similar recesses 2. The recesses 2 are in the form of a design, pattern and/or letter and have a width of at least 0.5 millimeters and preferably, 1 millimeter and a suitable depth within a range for allowing molded goods to be removed. A plate mold 4 is disposed over the mold 1 and secured to the mold 1 by means of set bolts 14 which in turn secure the mold assembly 1, 4 to a support framework 15. The plate mold 4 is formed with a plurality of through holes 3 substantially corresponding to the recesses 2 in configuration (as seen in plan) and position.

Decorative fatty confectionery material in a fluid state is sprayed in the form of fine particles through the through holes 3 of the plate mold 4 into the recesses 2 of the mold 1 to deposit in the recesses by the use of a spray device of which description will be made hereinafter. While the spray device is spraying the decorative fatty confectionery material, the spray device is moved along rails 16, 16 by means of the wheels 12, 12 at the bottom of the spray device to fill the successive recesses 2 in consecutive order with the decorative fatty confectionery material so as to cause the material to deposit uniformly in the recesses 2. The size of the decorative fatty material particles should be substantially smaller than the cross-section area of the openings of the recesses 2 of the mold 1 and through holes 3 of the plate molds 4. Otherwise, the decorative fatty material particles tend to adhere to the edges and/or the walls of the through holes 3 of the plate mold 4 and/or the side faces of the recesses 2 in the mold 1 to clog the openings of the holes 3 and/or recesses 2 to thereby block the arrival and deposition of the succeeding decorative material particles resulting in a reject having defects such as voids.

And when the decorative fatty material which may be ordinary chocolate or white chocolate is to be sprayed, if the temperature of the material is substantially high, $\beta$-type crystal nuclei in the cacao butter melt to nullify the tempering effects of the pre-tempered decorative fatty material or chocolate and as a result, the volume contraction does not occur in the deposited decorative fatty material when the fatty confectionery having the decorative fatty material deposited thereon is cooled and solidified to thereby make it difficult to release the resulting fatty confectionery from the mold and the confectionery product will be disposed as a reject. In addition, after the mold release, the fatty confectionery will have the lustress surface and the so-called fat bloom occurs to impair the commercial value of the fatty confectionery. Therefore, excess rise in the temperature of the decorative fatty confectionery material at the time of spraying should be avoided.

As one of the conventional methods for spraying fatty confectionery materials, the spray-under-pressure method has been known and according to this method, the fatty confectionery material is sprayed under pressure into air at high speed through a small diameter nozzle which atomizes the material. Although this method is applicable when the viscosity of the fatty confectionery material is on the order of several hundred centipoises, the fatty confectionery material exhibiting this order of viscosity is one which contains at least 80% by weight of cacao butter or combined cacao butter and vegetable fat based on the total weight of the fatty material. Such a high fat confectionery material is only a specific fatty confectionery material which is used as the primary coating for the center of the chocolate with liquid center. Such high fat content in chocolate naturally dilutes the chocolate and is not desirous because the fat substantially impairs the flavor of the chocolate. An ordinary chocolate containing 50-65% by weight of solids such as sugar, powdered milk and others based on the total weight of the chocolate will have the viscosity on the order of 20,000-30,000 centipoises or higher at 28°-29° C. after the screening through a 325 mesh sieve and tempering depending upon the particle size and the temperature of the chocolate, and because of a high inner friction resistance in the nozzle orifice, it is impossible to spray a high viscosity fatty confectionery material having a high viscosity such as chocolate in the form of fine particle at a high speed by the spray-under-pressure method and thus, this method is not suitable for spraying such a high viscosity fatty confectionery material.

On the other hand, although the two fluid nozzle spray method utilizing air or other gas is applicable to the spray of a fatty confectionery material such as chocolate having the viscosity on the order of 20,000-30,000 centipoises, because of the high viscosity, the particle size of the fatty confectionery material provided by the method will exceed 1 millimeter in diameter, and when the material is sprayed into the mold at a short distance therefrom, since a substantial amount of air or other gas carrying the particles of the fatty confectionery material therein and issuing at a high speed from the nozzle tend to blow off the previously sprayed and deposited fatty confectionery material particles deposited in the recesses in the mold as will be described in connection with the present invention hereinafter.

Figure 1:
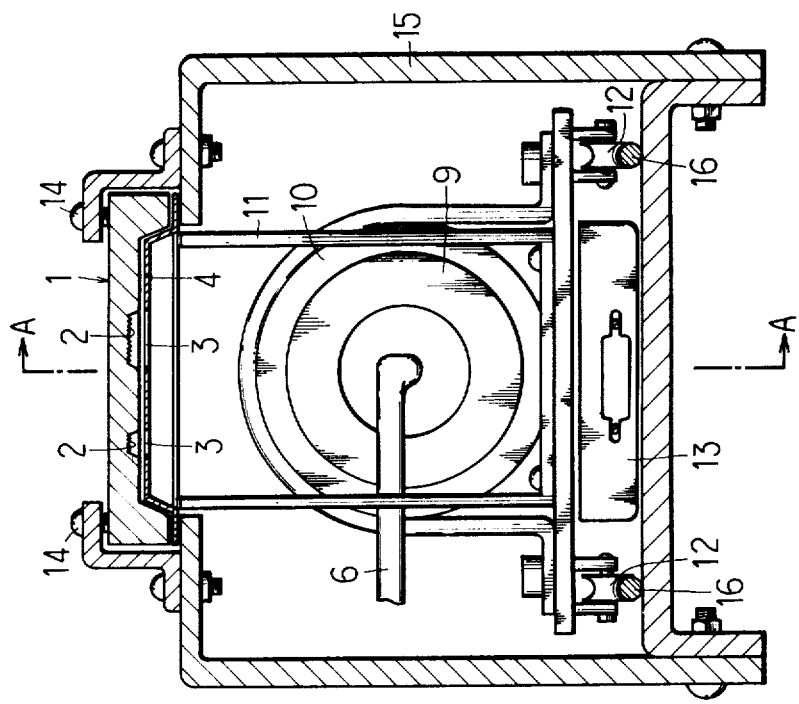
FIG. 1 is a front elevational view in vertical section of said apparatus.
Figure 3:
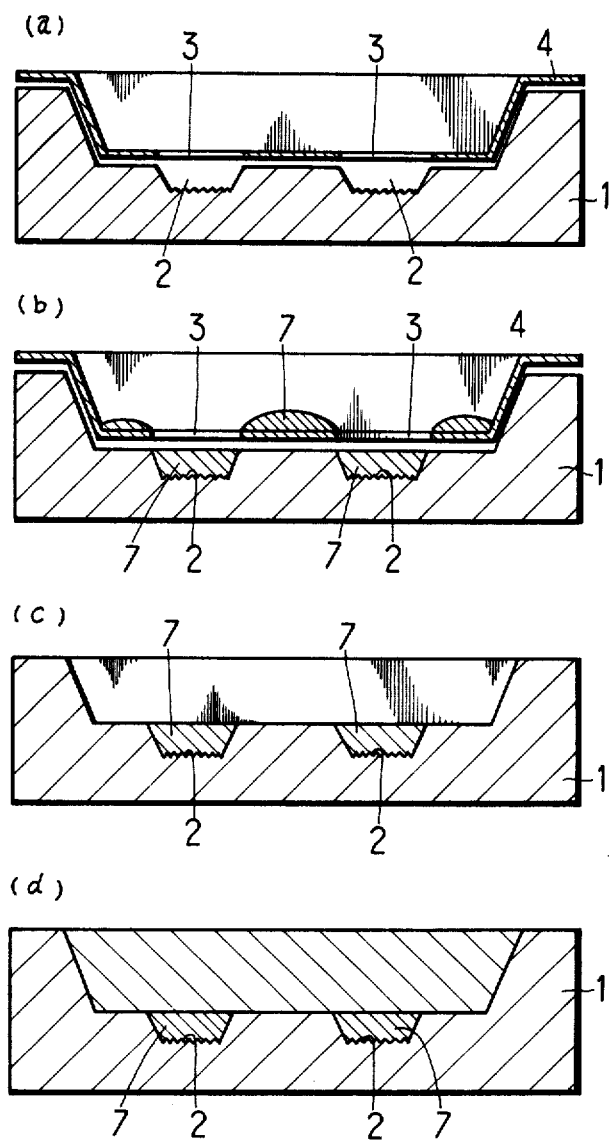
FIG. 3 is a vertically sectional view showing various stages in the production of a fatty confectionery in accordance with the method of the present invention.
Figure 6:
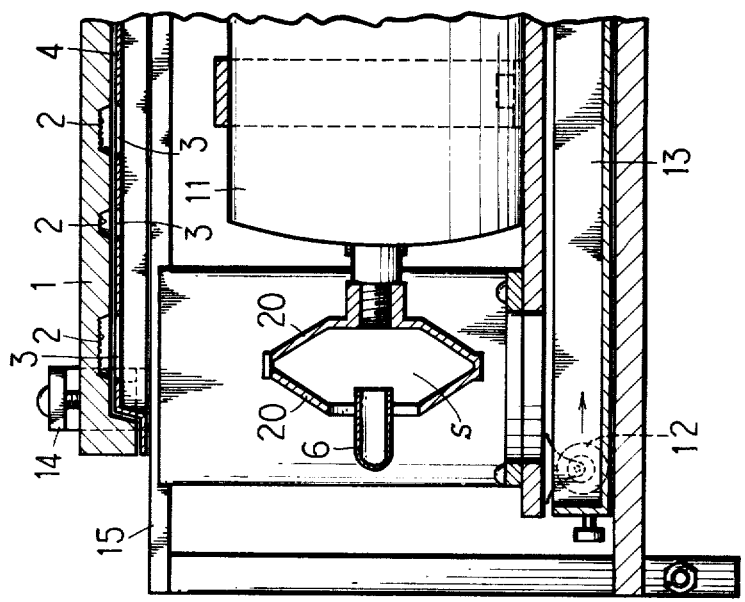
FIG. 6 is a front elevational view in vertical section of an alternative apparatus useful in carrying out the method of the present invention.
Figure 4:
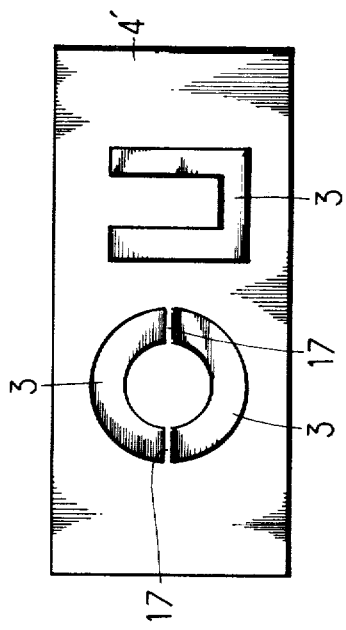
FIG. 4 is a plan view of a plate mold having through holes formed therein.
Figure 5:
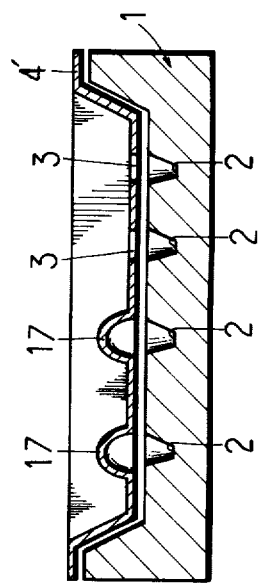
FIG. 5 is a vertically sectional view of said plate mold as shown in FIG. 4.
Figure 7:
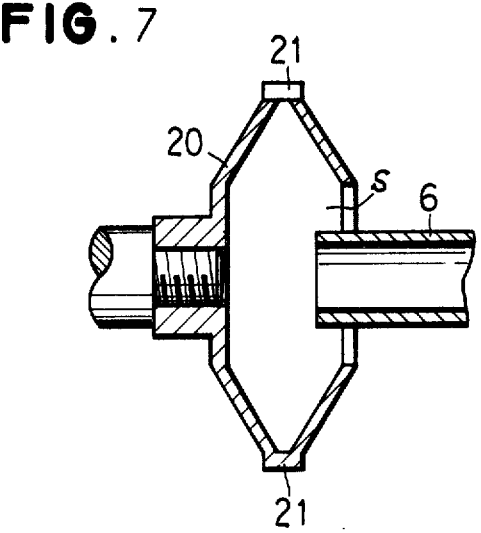
FIG. 7 is a vertically sectional view on an enlarged scale of the rotary member assembly and its drive means of the apparatus shown in FIG. 6.
Figure 8:
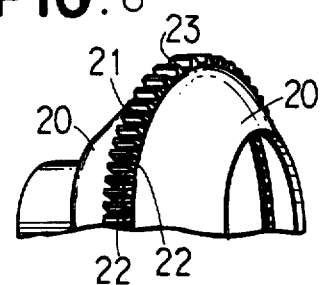
FIG. 8 is a fragmentary perspective view of the rotary member assembly.
Figure 9:
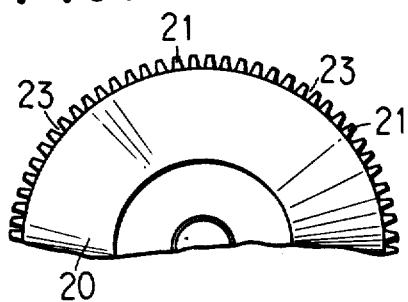
FIG. 9 is a fragmentary side elevational view of the rotary member assembly.

One method for spraying decorative fatty confectionery material such as chocolate is shown in FIGS. 1 and 2. As shown in these Figures, when decorative fatty material 7 in a fluid state is fed through a feed conduit 6 to a rotary member 5 of truncated conical cross-section, the material 7 is centrifugally uniformly spread over the inner surface of the rotary member 5 by the rotation of the member 5 and then flied off the outer edge 8 to become fine particles. The rotary member 5 is hollow and rotated by a high speed motor 10 operatively connected to the rotary member 5. By the spray method, even if the decorative fatty material has a high viscosity on the order of 90,000 cps which could not be sprayed by the conventional methods referred to hereinabove, the material can be sprayed into fine and substantially uniform particles of 0.5 mm diameter at the largest. And since the rotary member 5 does not have any portion where the material being sprayed at a high speed frictionally contacts and is stirred up and no heat is generated in the decorative fatty material and accordingly, this method is especially suitable for the spraying of high viscosity fatty confectionery material such as tempered chocolate.

Decorative fatty confectionery material such as chocolate is first perfectly melted at 50° C., then cooled to about 24°-25° C. and thereafter maintained at 28°-30° C. in a tempering device. The fatty confectionery material is then fed to the rotary member 5 while being maintained at the temperature. In this case, when the decorative fatty confectionery material has the particle size capable of passing entirely through a 325 mesh sieve and the total fat content of 35-42% by weight including cacao butter, vegetable oil and milk fat based on the total weight of the material the viscosity of the material is on the order of 25,000-90,000 cps.

The decorative fatty material is fed in a metered amount by a metering pump such as a geared pump to the vicinity of the axis of the rotation of the truncated conical rotary member 5 through the conduit 6. By adjusting the rotational velocity or circumferential velocity of the rotary member 5 depending upon the above-mentioned viscosity and the rate of feed of the decorative fatty material, the material can be sprayed in the form of fine particles having a uniform particle size on the order of 0.5 mm at the largest.

Furthermore, in the spray method described just above, the spray efficiency and the particle size of sprayed particles substantially vary depending upon the shape and circumferential velocity of the truncated conical rotary member 5. When the truncated conical rotary member has the sloped inner surface of an excessively obtuse angle, the sprayed decorative material will not be spread over the sloped inner surface, but immediately flies off the outer peripheral edge of the rotary member and the material is sprayed into coarse particles. Similarly, also when the rotary member is a rotary disc, the material is sprayed into coarse particles. However, when the outlet of the conduit 6 through which the decorative fatty material is fed is brought to a position in which the conduit outlet substantially contacts the vicinity of the center of the rotary disc, the decorative fatty material issuing through the conduit outlet is forcibly spread over the rotary disc and deposited thereon and the material is then flied off the peripheral edge of the disc. However, in the spray method using the rotary disc, when the supply amount of the decorative fatty material is increased, any excess amount of the fatty material other than the portion of the material which is deposited on the disc scatters about in coarse particles resulting in substantial reduction of the spraying efficiency.

In order to obtain fine particles of the decorative fatty material in a stabilized state and a large amount, the truncated conical rotary member 5 which flares towards the opening of the member 5 and has the sloped inner surface with the suitably obtuse angle as shown in FIG. 2 is preferably employed.

When the decorative fatty material is fed to the vicinity of the axis of rotation of the rotary member 5 through the feed conduit 6 as shown in FIGS. 1 and 2, the fatty material is subjected to a force which urges the material radially outwardly under the centrifugal force and thus, the fatty material is spread over the sloped inner surface of the rotary member 5, then forced to move along the sloped inner surface of the member and finally flied off the outer peripheral edge of the member 5 in the form of fine particles. Since the centrifugal force in the vicinity of the axis of rotation at the bottom of the rotary member 5 is substantially lower than that at the outer peripheral edge 8 of the member 5, the decorative fatty material 7 is forced to deposit on the bottom of the rotary member 5 and uniformly spread over the rotary member bottom without scattering about.

In the truncated conical rotary member 5 described hereinabove, the greater the angle α of the sloped inner surface with respect to the bottom of the rotary member 5 is, the spraying efficiency of high viscosity decorative fatty material is the higher. However, even the truncated conical rotary member 5 is employed, when the decorative fatty material has a high viscosity and a low fluidity, the rate at which the decorative fatty material 7 is spread over the sloped inner surface of the rotary member 5 is lower than the rotative velocity of the rotary member and thus, a portion of fatty material 7 tends to scatter about the outer peripheral edge of the rotary member 5. The scattering of a portion of the fatty material can be prevented by the provision of an annular flat plate 9 having substantially the same diameter of the opening of the rotary member 5 and positioned adjacent to the opening of the member 5.

The scattering prevention effect provided by the annular plate 9 is probably due to the fact that the scattering fatty material is arrested by the annular plate 9 and the arrested fatty material is sprayed under the centrifugal force provided by the annular plate 9.

The angle α of the sloped inner surface with respect to the bottom in the rotary member 5 is preferably at least 15° and for the arrangement it is effective that the higher the viscosity of the decorative fatty material is, the greater the angle α is. For a decorative fatty material having the viscosity on the order of 90,000 centipoises, the angle α is required to be at least 35°.

The annular plate 9 to be positioned adjacent to the opening or outer peripheral edge 8 of the rotary member 5 is usually spaced from the outer peripheral edge 8 at a distance of 0.5-2 millimeters. If the annular plate 9 is positioned closer to the outer peripheral edge 8 of the rotary member 5, since the fine particles of the fatty material are required to be sprayed through the clearance between the outer peripheral edge 8 of rotary member and annular plate 9, the size of the particles has to be excessively small. For the purpose, the rotative velocity of the rotary member 5 is required to be unnecessarily high and the unnecessarily high rotative velocity brings about waste of energy. On the other hand, when the annular plate 9 is positioned further away from the outer peripheral edge 8 of the rotary member 5, large particles of the decorative fatty material will pass through the clearance between the annular plate 9 and the other peripheral edge 8 of the rotary member and the annular plate 9 will not exhibit its prevention function from scattering. Therefore, in order to effectively prevent the particles of the decorative material from the scattering, the annular plate 9 is required to be positioned spaced from the outer peripheral edge 8 of the rotary member within above-mentioned distance range.

Furthermore, when the decorative fatty material 7 has a viscosity over 100,000 centipoises and a substantially low fluidity, such fatty material can not be easily spread over the sloped inner surface of the hollow truncated conical rotary member 5 and the material will fly off the outer peripheral edge 8 in the form of block rather than five particle. Thus, for the purpose of the present invention, the decorative fatty confectionery material having such exceedingly high viscosity is not suitable for use.

The particle size of sprayed particles of the decorative fatty confectionery material is principally determined depending upon the circumferential velocity of the rotary member 5, and the viscosity and feed amount of the fatty confectionery material to the rotary member 5. For example, when a decorative fatty confectionery material having the viscosity of 40,000 centipoises is fed at the rate of 20 grammes per minute by a metering pump to the vicinity of the axis of rotation of the rotary member 5 having the sloped inner surface with the angle α of 37° and the circumferential velocity at the outer peripheral edge 8 of 3.78 m/sec, the particle size of sprayed particles of the fatty confectionery material will be 1.03 mm at the largest. With the same angle α and the same material viscosity, when the circumferential velocity at the outer peripheral edge 8 is 9.25 m/sec and 13.42 m/sec, respectively, the particle size of sprayed material will be 0.57 mm and 0.49 mm at the largest, respectively. However, it is to be noted that the determination of the particle size in the experiments described above was made by the use of a micrometer built in a microscope for the same decorative fatty confectionery material sprayed on a glass sheet using the said rotary member 5. As clear from the measurement results, it will be understood that the higher the circumferential velocity is the smaller the sprayed particle size is. And in order to spray a decorative fatty confectionery material having the viscosity of 87,500 centipoises into particles of 0.5 mm diameter at the largest, the circumferential velocity at the outer peripheral edge of the rotary member 5 should be at least 12 m/sec. And in order to spray the same decorative fatty confectionery material into particles of 0.5 mm diameter at the largest with the supply amount of 110 grammes per minute for the material, the circumferential velocity at the outer peripheral edge of the rotary member 5 should be 20.88 meters per second. Thus, it will be understood that in order to obtain fine particles of the decorative fatty confectionery material, the circumferential velocity of the rotary member 5 should be increased in proportion to increase in the viscosity and supply amount of the decorative fatty confectionery material.

On the other hand, when the decorative fatty confectionery material to be sprayed is a non-tempered chocolate, the material is sprayed by the above-mentioned method maintaining the chocolate at a temperature above the melting point of the non-tempered fat in the chocolate.

In the spray of the tempered chocolate by the use of the spray device having the above-mentioned rotary member 5 incorporated therein, the decorative fatty confectionery material is sprayed in the form of particle having the diameter of 0.5 millimeters at the largest through the through holes 3 of the plate mold 4 disposed on and secured to the forming mold 1 by means of set bolts 14 into a selected one or ones of the recesses 2 in the mold 1 to be deposited in the recesses, the spray device having the rotary member 5 is moved along the guide rails 16, 16 by means of the wheels 12, 12 at the bottom the spray device to fill the fatty confectionery material into the successive recesses 2 in succession so as to uniformly deposit the fatty material in the recesses 2 and the plate mold 4 is then removed from the mold 1. On the other hand, the particle portion of the sprayed decorative fatty confectionery material other than that directed to the mold is arrested by the shield cover 11 and falls into the collection tray 13 positioned below the spray device to be recycled by a metering pump (not shown) for reuse.

As mentioned hereinabove, according to the present invention, since the decorative fatty confectionery material is sprayed into the recesses 2 engraved in the mold 1 and caused to deposit in the recesses, the operation for scraping the excess decorative fatty material from the plate mold 4 and the operations for forcing the decorative fatty material into the fine engraved recesses 2 are eliminated. Furthermore, the building up of the decorative fatty material on the engraved recesses 2 in a height corresponding to the thickness of the thin plate mold 4 which is one of the disadvantages inherent in the above-mentioned scraping method can be eliminated. The plate mold 4 can be repeatedly used in conjunction with second and third forming plates 1.

When the plate mold 4 is merely disposed on the mold 1, and not secured to the mold 1 by the set bolts 14, the plate mold 4 will not closely contact the forming mold 1 and the sprayed fatty material tends to enter the clearance between the plate molds 4 and the mold 1 whereby the fatty material may deposit itself at areas other than the recesses 2 resulting in a defective confectionery. If the plate mold 4 is extremely thin, the strength of the mold 4 is insufficient and tends to warp and thus, the mold 4 may not closely contact the plate 1. On the contrary, when the plate mold 4 is excessively thick, although the mold 4 may contact the mold 1 closely, the increase in the thickness extends the distance from the opening of the through holes 3 to the bottom of the engraved recesses 2. Thus, the sprayed decorative fatty confectionery material particles will stray in different directions and deposit on the wall faces of the through holes 3 to thereby impede free passage of the sprayed particles through the through holes 3 to the recesses 2 resulting in difficulty for filling of the sprayed particles in the recesses. Therefore, it is preferable that a plate mold 4 having a thickness one half the width of the engraved recesses 2 or a plate mold 4 having the depth in the areas defining the through holes 3 corresponding to about one half the width of the recesses 2 is employed.

When the recesses formed in the mold are annular shaped, as mentioned hereinabove, a plurality of bridge portions 17 are necessary to connect between the circular shielding areas of the plate mold and the matrix of the plate mold. The plate mold having such a construction is shown by reference numeral 4' in FIG. 4. In this plate mold, the sprayed fatty material tends to migrate under the bridge portions and the recesses positioned below the bridge portions may not be perfectly filled with the sprayed material. However, if the bridge portions 17 are replaced by upwardly warped wire sections, since a sufficient space is provided apiece between the bridging wire sections and the recesses 2, the sprayed decorative fatty material particles migrate below the wire sections in different directions whereby the particles are uniformly filled and deposited in the recesses.

As described hereinabove, according to the present invention, the operation for scraping of the excess material is eliminated and the warped bridge portions formed of wire sections will not impede the material deposition and filling whereby the plate mold can be repeatedly employed. However, if the sprayed decorative fatty material particles deposit on the plate mold 4 excessively, the excessively deposited particles have to be removed by a suitable means. The removal of excessively deposited material can be performed by blowing warmed air against the plate mold 4 to blow the material off the mold or lightly vibrating the plate mold to allow the material to drip down. By either of the removal methods, the excess material can be removed without impeding the spraying and filling of the decorative fatty material into the recesses.

As to the recesses 2 to be engraved in the mold 1, the recesses should have an inverted trapezoid cross-section with the larger dimensional opening portion so that the resulting fatty confectionery can be smoothly removed from the mold 1 after the cooling and solidification thereof. If the opening of the recesses 2 is excessively narrow, the recesses will have a substantially triangular cross-section with a reduced depth. Although the recesses of triangular cross-section form a three-dimensional design, pattern and/or letter configuration decoration, the trapezoid cross-section recesses having a greater depth form a more excellent three-dimensional design, pattern and/or letter configuration decoration. The trapezoid cross-section recesses should have the opening width of at least 1 mm. The depth of the recesses may be increased if a large design, pattern and/or letter configuration decoration is desired to be formed. However, when the recesses have design, pattern and/or letter configuration of different depths, the deposition height of the decorative fatty material should be adjusted in conformity with the different depths of the recesses. This makes the spraying operation very difficult. Generally, the recesses 2 are formed having substantially the same depth, corresponding to the depth of the recesses 2 having the smallest opening width because of the reason mentioned hereinabove. Therefore, although the diameter of the sprayed decorative fatty material particles may be 1 mm at the largest, the particle size should be substantially smaller than the opening width of the recesses for the reason mentioned hereinabove. Generally, the particle size is 0.5 mm at the largest.

When ordinary chocolate is desired to be employed as the decorative fatty material to be sprayed into and deposited in the recesses 2, the fatty material is cooled to a temperature below the melting point of cacao butter and when non-tempered chocolate is desired to be employed, the chocolate is cooled to a temperature below the melting point of the non-tempered fat. The cooling of the chocolate deprives the chocolate of the fluidity. After the cooling of the decorative fatty material sprayed into the recesses the base fatty confectionery material is poured into the recesses 2 over the deposited decorative fatty material and the mold 1 is vibrated to eliminate all the air bubbles from the base fatty material, and the resulting confectionery is cooled and solidified and removed from the forming mold.

The elimination of the fluidity from the decorative fatty material sprayed into and deposited in the recesses is necessary for the two reasons. One of the reasons is that the displacement and leakage of the sprayed and deposited decorative material from the recesses is to be prevented when the mold assembly is vibrated for de-aeration. The other is that if the sprayed and deposited decorative fatty material is perfectly cooled and solidified before the base fatty confectionery material is poured, the decorative fatty material insufficiently unites with the base fatty confectionery material. The non-fluid decorative fatty material such as chocolate maintains its uniting capability with the base fatty confectionery material within the viscosity range of 100,000–200,000 cps.

When the decorative fatty material is sprayed into and filled in the recesses disposed at an angle such as when the recesses are formed in a sloped surface of the mold or the mold is inclined, the sprayed material requires a rather long time before the material loses its fluidity, the material tends to flow from its intended position and thus, if the mold is previously cooled so as to deprive the sprayed decorative fatty material of its fluidity in a short time to thereby prevent the sprayed material from flowing.

In such a case, the cooling temperature of the mold is related to the viscosity of the decorative fatty material to be sprayed thereon. For example, when the decorative fatty material has the viscosity of 25,000 centipoises, the temperature of the mold surface is 14° C., for the viscosity of 50,000 centipoises, the temperature is 24° C. and for the viscosity of 78,000 centipoises, the temperature is 27° C., respectively. In an alternative method, the mold is cooled to 11° C. or below, the decorative fatty material is sprayed into and deposited in the recesses in the mold, immediately thereafter the mold is cooled to solidify the fatty material, just prior to the pouring of the base fatty confectionery material such as chocolate, the mold is warmed by means of a heater such as an infrared ray lamp to soften the decorative fatty material to a degree not to impart fluidity to the fatty material and finally, the base fatty confectionery material is poured into the mold to cause the two materials to unite together.

And as mentioned hereinabove, according to the present invention, since the decorative fatty material is exclusively sprayed and deposited in the recesses 2 of the mold 1, even if the decorative fatty material is non-tempered chocolate, the so-called fat bloom which requires the further scraping over the plate mold will not occur. Therefore, the present invention has the advantage that any combination of non-tempered chocolate and ordinary chocolate requiring tempering can be freely employed as the combination of the decorative fatty material and base fatty confectionery material.

Referring now to FIGS. 6 through 9 in which alternative apparatus useful in carrying out the method of the present invention is shown, since the apparatus is substantially similar to the apparatus shown in FIGS. 1 through 5 except for the rotary member, description will be made on only the rotary member.

In this apparatus, the rotary member is replaced by a rotary member assembly and the rotary member assembly comprises a pair of hollow truncated conical similar rotary members 20, 20 which are assembled together at their outer peripheral edges with the concaved sides of the members facing each other to define a space S therebetween. The rotary member 20 is formed at the outer peripheral face with a plurality of equally spaced projections 21 and a plurality of equally spaced spouting orifices 22 positioned between the adjacent projections 21. The projections 21 taper radially outwardly to define spaces 23 therebetween which flare outwardly. Therefore, as the decorative fatty confectionery material is sprayed through the orifices 22 under centrifugal force as the rotary member assembly rotates, the decorative fatty confectionery material is subjected to a frictional resistance lower than that in the case of the foregoing apparatus and the sprayed particles can be more uniformly and nearly at the rate of twice volume per second distributed to all the corners of the design, pattern and/or letter configuration recesses of the forming mold.

The viscosities of the base and decorative fatty materials such as chocolates were measured by a B-type viscosimeter manufactured by Toki Sangyo K.K. and the particle size of the decorative fatty materials were measured by removing fat from the decorative fatty material by petroleum ether and passing the residue through a JIS (Japanese Industrial Standard) Z 8801 Standard 325 mesh sieve.

EXAMPLE 1

A mold having the bottom surface area of 80×60 mm and the depth of 10 mm and provided with a plurality of three-dimensional design, pattern and/or letter configuration recesses with inverted trapezoid cross-section each having the width of at least 1 mm and the depth of 1 mm is provided, the mold is cooled to the mold surface temperature of 18° C. by exposing the mold to cold air maintained at 12° C. and flowing at the rate of 0.7 meters per second for two minutes, a copper plate mold having the thickness of 0.5 mm and a plurality of through holes substantially corresponding to the recesses in configuration and position is disposed on and secured to the mold in close contact therewith and the mold assembly is maintained in its erect position.

With the mold assembly maintained in this position, a hollow truncated conical rotary member having the sloped inner surface at the angle of 15° is horizontally positioned spaced from the mold assembly by the distance of 12 centimeters with the opening directing upwardly.

On the other hand, 41.5 parts of pulverized sugar, 21.4 parts of whole fat powdered milk, 36.3 parts of cacao butter, 0.5 parts of soy bean lecithin, 0.05 parts of food flavor and a small amount of yellow food color are admixed, and the mixture is ground to the particle size capable of entirely passing through a 325 mesh sieve with a three-roll refiner to obtain a yellowish white decorative chocolate.

The decorative chocolate is heated to 50° C. to perfectly melt the chocolate and then cooled to 24° C. while being stirred and thereafter heated to 29° C. to temper the chocolate. The temperature chocolate has the viscosity of 38,500 centipoises.

The tempered chocolate is fed at the rate of 85 grammes per minute through the conduit to the center of the bottom of the truncated conical rotary member positioned in the above-mentioned position and rotating at the circumferential velocity of 4.3 meters per second and sprayed in the form of particle through the through holes in the plate mold into the recesses of the mold to be uniformly deposited in the recesses.

Thereafter, after the plate mold is removed the mold is returned to its horizontal position with the bottom disposed down, and the mold is left at room temperature of 27° C. for one minute.

Meantime, 20.0 parts of cacao mass, 45.0 parts of pulverized sugar, 19.0 parts of whole fat powdered milk, 16.0 parts of cacao butter and 0.5 parts of soy bean lecithin are admixed and ground in the same manner as described in connection with the preparation of the decorative fatty material or chocolate to provide a base chocolate. The base chocolate is tempered and poured into the mold by 23 grammes, and the mold is vibrated to remove air bubbles from the chocolate. Thereafter, the mold filled with chocolate is left in a tunnel where air at 12° C. flows to be cooled and solidified. Thereafter, the base chocolate having the decorative chocolate deposited thereon is removed from the mold.

The thus obtained chocolate has the excellent lustrous surface having the yellowish white decorative chocolate deposited thereon in three-dimensional design, pattern and/or letter configuration having the thickness of 1 mm to give excellent attractive appearance to the chocolate.

EXAMPLE 2

A mold identical with said mold as described in Example 1 is cooled by being exposed to cold air at 12° C. flowing at the rate of 0.5 meters per second for three minutes to adjust the surface temperature of the mold to 16° C. Immediately after the adjustment, a copper plate mold having the through holes corresponding to the recesses in configuration and position and the thickness of 0.5 mm is disposed on and secured to the mold in close contact therewith. The mold assembly is inverted to dispose the bottom surface of the mold top and is maintained in its horizontal position as illustrated in FIG. 1, 2. Thereafter, a hollow truncated conical rotary member having sloped inner surface at the angle of 30° and spaced from the mold assembly by the distance of 10 cm and with an annular plate positioned spaced from the outer peripheral edge of the rotary member by the distance of 2 mm is vertically positioned with the opening or outer peripheral edge of the rotary member facing the mold assembly.

Meantime, 45.0 parts of pulverized sugar, 16.0 parts of whole fat powdered milk, 3.6 parts of cacao butter, 32.4 parts of non-tempered fat (Merano STM having the melting point of 36° C. manufactured by Fuji Seiyu K.K., Japan), 3.0 parts of lactose, 0.05 parts of food flavor and 0.5 parts of soy bean lecithin are admixed and ground to the same particle size in the same manner as in Example 1 to provide a yellowish white non-tempered chocolate capable of entirely passing through a 325 mesh sieve.

The thus obtained yellowish white non-tempered decorative chocolate is maintained at 40° C. (the viscosity of 35,000 centipoises) and fed at the rate of 120 grammes per minute by a metering pump through a conduit to the center of the bottom of a hollow truncated conical rotary member rotating at the circumferential velocity of 4.0 meters per minute and is sprayed off the outer peripheral edge of the rotary member to be uniformly deposited in the recesses of the mold.

Thereafter, the plate mold is removed from the mold and the mold is inverted. The mold is then left in a refrigerator for ten minutes to cool and solidify the decorative non-tempered chocolate in the recesses. Thereafter, the mold is taken out of the refrigerator and only the upper surface of the decorative non-tempered chocolate (the surface unites with the base chocolate to be poured later) is exposed to an infrared ray lamp of 200 Watts to be warmed and softened to a degree not to impart fluidity.

A base chocolate having the same composition as that employed in Example 1 is poured by 23 grammes into the mold, the mold is then vibrated to completely remove air bubbles from the resulting chocolate and is left in a cooling tunnel in which air at 12° C. flows to be cooled and solidified. The solidified resulting chocolate is then removed from the mold.

The thus obtained chocolate has the lustrous surface with the yellowish white decorative non-tempered chocolate deposited thereon in three-dimensional design, pattern and/or letter configuration with the thickness of 1 mm and thus, the chocolate is attractive.

While two embodiments of the invention have been shown and described, it will be understood that these are described only for the purpose of illustration and should not to be taken as a definition of the invention, reference being made for this purpose to the appended claims.

What is claimed is:

1. A method for producing fatty confectioneries having three-dimensional decoration in design, pattern and/or letter configuration deposited thereon, comprising the steps of providing a mold having a plurality of three-dimensional recesses in design, pattern and/or letter configuration, placing a plate mold having a plurality of through holes substantially corresponding to said recesses in configuration and position on said mold with the through holes in alignment with the recesses, spraying decorative fatty confectionery material in the form of fine particles into said recesses through said through holes, removing said plate mold from said mold, pouring base fatty confectionery material having a color tone different from the color tone of said decorative fatty confectionery material into said mold, cooling said forming mold to solidify said base and decorative fatty confectionery material and removing the resulting confectionery from said mold.

2. The method as set forth in claim 1, in which said recesses have a width of at least 1 mm and a depth which allows said confectionery to be released from said recesses mold and said decorative fatty confectionery material has a viscosity of 90,000 centipoises or below.

3. The method as set forth in claim 1, in which said particle has a diameter of 0.5 mm at the largest.

4. The method as set forth in claim 1, in which said decorative fatty confectionery material is fed to the bottom of a hollow truncated conical rotary member and sprayed off the outer peripheral edge of said rotary member.

5. The method as set forth in claim 1, in which said decorative fatty confectionery material is fed to the bottom of a hollow truncated conical rotary member and sprayed through the clearance between said outer peripheral edge of the rotary member and an annular plate positioned spaced from the outer peripheral edge of said rotary member in opposing the peripheral edge.

6. The method as set forth in claim 5, in which the annular plate is positioned spaced from the outer peripheral edge of the rotary member at a distance of 0.5–2 millimeters.

7. The method as set forth in claim 4 or 5, in which the inner surface of said rotary member is sloped with respect to the bottom of the rotary member at an angle of at least 15°.

8. The method as set forth in claim 1, in which said through holes in the plate mold have a depth of 1 mm at the largest.

9. The method as set forth in claim 1, in which said mold is previously adjusted to a temperature of 27° C. or below.

10. The method as set forth in claim 1, in which said plate mold has through holes connected to the matrix of the plate mold by means of upwardly warped wire sections.

11. The method as set forth in claim 1, in which said decorative fatty confectionery material is fed to the bottom of a pair of hollow truncated conical rotary members, which are assembled together at their outer peripheral edges with the concaved sides of the members facing each other to define a space therebetween, having plurality of equally spaced radially tapered projections and sprouting orifices therebetween at said peripheral edges.

* * * * *